Feb. 22, 1927. 1,618,455
H. B. LINDSAY
REFRIGERATOR PIPE INSULATE
Filed Nov. 1, 1922
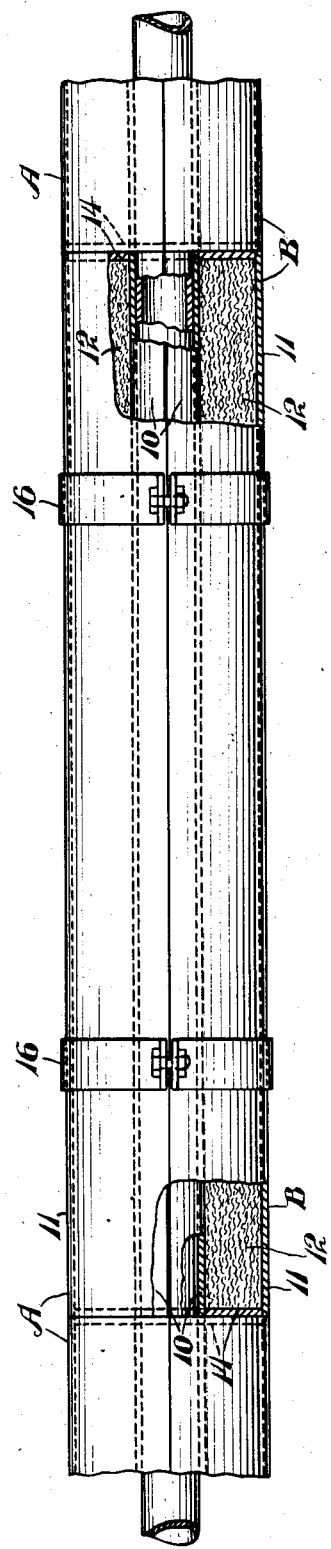
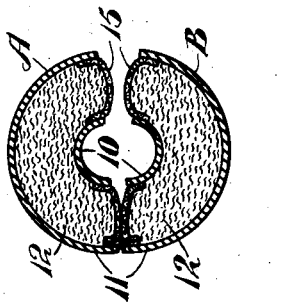
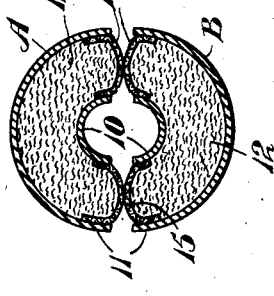
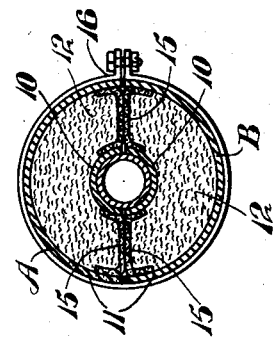
Inventor
Harvey B. Lindsay
By Dewey, Strong,
Townsend and Loftus.
Attorneys Patented Feb. 22, 1927.

1,618,455

UNITED STATES PATENT OFFICE.

HARVEY B. LINDSAY, OF OAKLAND, CALIFORNIA, ASSIGNOR TO DRY-ZERO CORPORATION, OF CHICAGO, ILLINOIS, A CORPORATION OF DELAWARE.

REFRIGERATOR-PIPE INSULATE.

Application filed November 1, 1922. Serial No. 598,255.

This invention relates to the insulation of refrigerator pipes, and has for its object to utilize a loose fibrous insulating material, preferably kapok.

In carrying out this object I employ inner and outer casing members, preferably made in semi-cylindrical sections. Between these casing members I arrange the loose fibrous insulating material. Means are provided for keeping the insulating material in place during shipping and assembling. The two sections are brought together to enclose a pipe and are held in place by suitable clamping means.

In the accompanying drawing:

Fig. 1 shows a plan view of my improved insulating arrangement in place on a pipe.

Fig. 2 shows a cross section of the same.

Fig. 3 shows a cross section of the two semi-cylindrical portions before assembling.

Fig. 4 shows a cross section of the parts shown in Fig. 3 provided with a hinge connection between the two sections.

As illustrated herein, the insulating material is made in two semi-cylindrical sections A and B. Each section includes an inner casing 10 and an outer casing 11 of a semi-rigid character spaced apart with a filling of loose fibrous insulating material 12 between. The sections are made in suitable lengths, the ends being closed by segmental plates 14. For closing the space lengthwise between the casing members I make use of a thin cloth or gauze 15, which is fastened in place in any desired way and has sufficient slack to allow the fibrous material to bulge slightly.

The sections are assembled, as shown in Figs. 1 and 2, being held in place by suitable clamping bands 16. As shown in Fig. 3, the insulating material is allowed to bulge somewhat, so that when the two halves are pressed together the joint between is sealed. If desired, the two halves may be hinged together, as shown in Fig. 4.

Any suitable material may be used in the casing sections, such as fiber board, galvanized metal, etc. having sufficient strength to support the insulating material. I prefer, however, to use kapok as the insulating material, since I find that it possesses insulating properties of a high degree. The quantity used is about 88/100ths pound to the cubic foot. In other words, the fibrous material should not be packed too solidly, as to do so would impair its insulating qualities.

Various changes in the construction and arrangement of the several parts herein shown and described may be employed without departing from the spirit of my invention as disclosed in the appended claim.

Having thus described my invention, what I claim and desire to secure by Letters Patent is:—

A refrigerator pipe insulation comprising two semi-cylindrical sections, each having concentric inner and outer casings of different diameters, a filling of loose kapok between the casings, a slack fitting flexible fabric arranged between the edges of the casing members of each section allowing the edges of each section to bulge slightly, and means for clamping said sections about a pipe to clamp the contiguous edges of the sections tightly together.

HARVEY B. LINDSAY.